United States Patent [19]

Dalton, Jr.

[11] Patent Number: 4,684,429

[45] Date of Patent: Aug. 4, 1987

[54] METHOD OF MAKING A LAMINATED PRINTING PLATE

[76] Inventor: Edward L. Dalton, Jr., 602 N. Willow, Tampa, Fla. 33606

[21] Appl. No.: 622,208

[22] Filed: Jun. 19, 1984

[51] Int. Cl.[4] ............ B32B 31/12

[52] U.S. Cl. ............ 156/323; 101/395; 101/401.1; 156/295; 428/416; 428/464

[58] Field of Search ............ 101/395, 401.1; 156/323, 295; 428/68, 76, 416, 464

[56] References Cited

U.S. PATENT DOCUMENTS

| | | | |
|---|---|---|---|
| 2,704,512 | 3/1955 | Alexander | 101/401.1 |
| 3,361,063 | 1/1968 | Thorpe et al. | 101/401.1 X |
| 3,513,066 | 5/1970 | Myers | 101/395 X |
| 3,929,073 | 12/1975 | Bretthauer et al. | 101/395 X |
| 3,932,250 | 1/1976 | Sato et al. | 156/323 X |
| 4,119,035 | 10/1978 | Reiser et al. | 101/459 |
| 4,136,615 | 1/1979 | Pozniak | 101/401.1 |

*Primary Examiner*—Robert A. Dawson

*Attorney, Agent, or Firm*—Dominik, Stein, Saccocio & Reese

[57] ABSTRACT

A method is disclosed for producing a photoengravable, laminated printing plate including the steps of applying a homogeneous adhesive free of noncompressible materials between mating sheets of magnesium and steel and then placing the mated sheets into a press to compress the mated sheets until the adhesive is uniformly dispersed therebetween.

8 Claims, 1 Drawing Figure

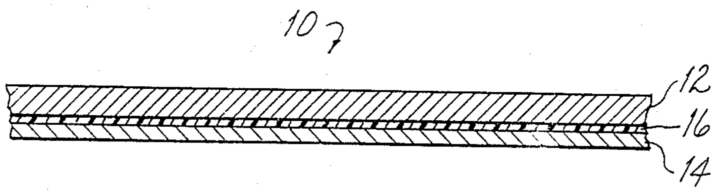
10
12
16
14

METHOD OF MAKING A LAMINATED PRINTING PLATE

BACKGROUND OF THE INVENTION

1. Field of the Invention

This invention relates to laminated printing plates which are photoengraved for use in printing articles. More particularly, this invention relates to laminated printing plates comprising a metal such as magnesium and zinc which are bonded to a self-supporting, dimensionally stable base structure. This invention also relates to a method for producing laminated printing plates.

2. Description of the Prior Art

The process of photoengraving is widely used in virtually all forms of printing for printing newspapers, books, packaging and containers of all sorts. Basically, conventional photoengraving process involves coating a metal plate, such as magnesium, zinc and their alloys, with a photoresist layer. The photoresist layer is exposed to a desired negative containing the printing to be performed. After the exposed photoresist layer is developed, the metal plate is placed in an aqueous, nitric acid bath which etches all of the unprotected surface areas of the metal plate. When the desired relief is obtained, the metal plate is removed from the bath and washed. In many applications, the metal plate is bent to a curved design and fitted onto the outer surface of a print cylinder of a printing machine. Means are usually provided for properly registering the metal plate on the cylinder.

Presently there exist many types of metal plates of various thicknesses which are used in the photoengraving process. Some of these metal plates are plated or laminated with other materials including other metals and plastics. For example, U.S. Pat. No. 2,704,512 discloses a magnesium base metal printing plate onto which is plated a skin of zinc of uniform thickness in the order of 0.003 inch to 0.0003 inch. This plate was designed to be etched by the powder etching method common during that period of time. However, since the development of powderless etching techniques, this plate has become obsolete. U.S. Pat. No. 4,119,035 discloses a flexible metal printing plate comprising a layer of copper bonded to the top surface of the base layer of iron with a layer of chromium bonded to the top surface of the copper and a layer of zinc bonded to the undersurface of the iron layer. This plate, as a wet offset plate, would be unsuitable as a dry offset plate in many respects. U.S. Pat. No. 3,361,063 discloses a printing plate comprising an etchable metal bonded to a metal backing layer by means of an adhesive layer encapsulating at least one layer of woven glass cloth. The glass cloth allows the combined etchable layer and metal backing layer to be compressed with great force without squeezing out all of the adhesive since the glass cloth functions as a stop, determining the thickness of the adhesive. However, the use of glass cloth produces a weak bond at all of the points which the cloth strands contact the compressed layers. A weak bond is unacceptable for many applications. For example, process color applications involve reproducing pictures by using very fine "dots" etched on the printing surface of the printing plate. Those dots which are located over a strand of the cloth are not sufficiently adhered to the plate, and will, during use, lose their bond with the plate and break away, resulting in inferior printing. U.S. Pat. No. 3,929,073 discloses a printing plate comprising an aluminum-zinc cladding plate which is anealed to an aluminum alloy plate. This plate is not usable on a magnetic cylinder, is not strong enough to clamp to a cylinder without stretching, and is extremely difficult to etch. Finally, U.S. Pat. No. 4,136,615 discloses a laminated plate in which a sheet of magnesium is laminated to a self-supporting, dimensionally stable, all plastic base structure. While easier to etch, this plate suffers from the same disadvantages of the latter plate.

Each of these printing plates disclosed in the above referenced patents, the disclosures of which are hereby incorporated by reference herein, have contributed in some form or another to the advancement of the art. However, there are numerous disadvantages to these printing plates, some of which were outlined above.

Therefore, it is an object of this invention to provide an apparatus and a method which overcomes the aforementioned inadequacies of the prior art devices and provides an improvement which is a significant contribution to the advancement of the printing plate art.

Another object of this invention is to provide a laminated printing plate composed of a sheet of magnesium, or other etchable metal, bonded to a metal layer by means of an adhesive.

Another object of this invention is to provide a laminated printing plate having a thickness which is compatible with print cylinders of existing rotary printing machines.

Another object of this invention is to provide a laminated printing plate which is not adversely affected by etching acids and other chemicals commonly used in the photoengraving processes.

Another object of this invention is to provide a laminated printing plate which can be used in long runs and at high speeds in the printing of articles without degradation of the printing plate itself or the quality of the printing.

Another object of this invention is to provide a laminated printing plate which may be curved to the radius of the print cylinders of rotary printing machines without unwanted distortion of the photoengraved print in the magnesium.

Another object of this invention is to provide a laminated printing plate composed of a sheet of etchable magnesium which, upon curving to fit a print cylinder, produces a matte finish to facilitate the transfer of ink from the ink roller to the article being printed in a more uniform manner than that which could be accomplished by prior art printing plates.

Another object of this invention is to provide a laminated printing plate composed of stock materials of conventional sizes which are available from multiple sources.

Another object of this invention is to provide a method for producing a laminated printing plate in which a sheet of magnesium, or other etchable metal, is bonded to a metal layer by means of an adhesive.

Another object of this invention is to provide a method for producing a laminated printing plate in which the various materials used throughout the method can be purchased as stock items from multiple sources.

Another object of this invention is to provide a method for producing a laminated printing plate which can be accomplished by machines and equipment normally found in complete photoengraving businesses, thereby eliminating the need for purchasing expensive tooling and equipment.

Another object of this invention is to provide a method for producing a laminated printing plate which can be accomplished on a relatively small scale without a large capital investment over and above the equipment normally found in complete photoengraving businesses.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a laminated printing plate apparatus and method. More particularly, the apparatus of the invention comprises a laminated printing plate including a sheet of magnesium which is adhered to a sheet of standard steel by means of a structural adhesive. Preferably, the sheet of magnesium is on the order of twenty to twenty-five mils in thickness and the sheet of steel is on the order of eight to ten mils in thickness. With the adhesive layer being on the order of two to three mils, the overall thickness of the laminated printing plate of the invention is on the order of thirty to thirty-eight mils. This overall thickness is compatible with the great majority of print cylinders presently in use. Further, the combination of magnesium and steel provides a printing plate which can be photoengraved to a highly desirable etched relief of twenty mils or more while providing a durable backing of steel for mounting on the print cylinder of a rotary printing press. The printing plate may be chromed to increase the run time of the plate.

The method of the invention basically comprises laminating the sheet of steel and the magnesium together by means of the adhesive in such a manner that a solid, uniform bond exists between the entire mating surfaces of the steel and magnesium thereby, unlike U.S. Pat. No. 3,361,063, eliminating any weak spots in the laminating process which could cause delamination of the laminates during the photoengraving process or during use in the printing of the articles, particularly when the plate is being used in process color applications.

The steps of this unique process comprise sanding the mating surfaces of the steel and the magnesium to remove the protective coatings that may have been placed thereon by the manufacturer and to roughen the surfaces. The surface of both the metal and the magnesium are then cleaned with a suitable cleaner such as acetone to remove the grit or any oil or waxes that may exist on the surface. An easily spread structural adhesive, such as non-metallic filled, is removed from refrigeration and allowed to reach room temperature whereupon it is applied to the sanded side of the magnesium sheet and trialed until fairly smooth. The sheet of steel is then placed on top of the sheet of magnesium and the combination is placed within a heat press and compressed until approximately three mils of adhesive remains between the adjoining layers of magnesium and steel. After approximately fifteen minutes of heating at approximately three hundred degrees Fahrenheit, the combination is removed from the heating press.

The above described method of this invention produces a printing plate which is highly superior in many regards from those presently known in the industry. Specifically, the method of the invention produces a printing plate composed of a steel backing sheet which is significantly more durable than aluminum or plastic backing sheets. The steel backing sheet allows the printing plate to be used in conjunction with printing cylinders which magnetically hold the printing plate in position rather than using gripper bars or the like. Additionally, the method of the invention unexplainably produces a highly desirable matte finish on the surface of the magnesium plate when the plate is curved to fit a print cylinder. This matte finish greatly increases the uniform transfer of ink from the ink roller to the article being printed during the printing process. Finally, during the photoengraving and etching processes, the magnesium is etched more sharply than what has been experienced with prior art printing plates. The matte finish and the sharp relief of the laminated printing plate procedure by the method of this invention is a marked advance over presently known printing plates.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific examples disclosed may be readily utilized as a basis for modifying or designing other methods for carrying out the same purposes of the present invention. It should also be realized by those skilled in the art that such equivalent methods do not depart from the spirit and scope of the invention as set forth in the appended claims.

DETAILED DESCRIPTION OF THE PRINTING PLATE APPARATUS

FIG. 1 is a cross-sectional view of the printing plate 10 of the invention comprising a sheet of etchable metal 12 bonded to a sheet of support metal 14 by means of an adhesive 16. The etchable metal 12 is characterized as being easily etched by conventional etching acids and techniques commonly used in complete photoengraving businesses. Preferably, the etchable metal 12 comprises magnesium, which experience has shown to be easily etched to a sharp relief by conventional techniques. However, other etchable metals 12 may be utilized without departing from the spirit and scope of this invention.

The sheet of support metal 14 is characterized as being sufficiently durable to support the etchable metal 12 adhered to it and to allow mounting on a print cylinder or the like. Preferably, the support metal comprises steel or other metal capable of being affixed to a magnetic print cylinder. The sheet of support metal 14 is preferably composed of hard or half-hard tempered steel and more preferably, hard tempered steel.

The adhesive 15 is characterized as being capable of adhering the sheets of etchable and support metal 12 and 14 together without degradation upon exposure to the various chemicals used in the photoengraving and etching process. While many adhesives may be suitable, adhesive 16 preferably comprises a one-part, easily spread epoxy. More preferably, adhesive 16 comprises a one-part, non-metallic filled epoxy sold under the trademark "Scotch-Weld" by designation 2214, by the Adhesive Coatings and Sealers Division of the 3M Company.

SPECIFIC EXAMPLES OF THE PRINTING PLATE METHOD

The following examples relate to the manufacture of a laminated printing plate according to the method of the invention.

EXAMPLE 1

A sheet of magnesium, or other etchable metal, is provided having approximately the dimensions of twenty-four inches by thirty-six inches by twenty-five mils thick. A sheet of cold rolled stripped steel is provided having approximately the dimensions twenty-four inches by thirty-six inches by ten mils thick. Preferably, the sheet of steel is of the type identified by the American Iron and Steel Institutes (AISI) Number C1010 characterized as having a carbon content of 0.08 to 0.13, a magnesium content of 0.30 to 0.60, a maximum phosphorus content of 0.040, and maximum sulphur content of 0.050. Further, the sheet of steel preferably has been cold rolled to a temper of No. 1 (hard) and is hardened to a minimum of 90 on the "B" scale of the Rockwell Hardness Scale.

One side of both the sheet of magnesium and the sheet of steel (hereinafter referred to as the mating surfaces) are sanded by an orbital sander using 36 grit sand paper to remove any surface contaminants or protective coatings on the same. Each of the mating surfaces are then cleaned with acetone.

The structural adhesive to be used preferably comprises an easily spread adhesive such as the one-part, non-metallic filled epoxy sold under the trademark "Scotch-Weld" by designation number 2214, by the Adhesive Coatings and Sealers Division of the 3M Company of St. Paul, Minn. A container of this type of adhesive is removed from refrigeration and brought up to room temperature whereupon approximately three U.S. fluid ounces of the adhesive are applied to the mating surface of the sheet of magnesium. The adhesive is trialed on the surface of the magnesium until roughly even to approximately five mils. The sheet of steel is then placed on top of the sheet of magnesium.

The mated sheets of steel and magnesium are placed on a sheet of paper and then a second sheet of paper is placed on top such that the mated sheets of magnesium and steel are fully enclosed by the paper. Preferably, the paper is of the type manufactured from wood pulp and sold under the trademark "Kraft". The paper is sufficiently porous to allow the adhesive to filter therethrough during later steps of the method. The paper functions to protect the mated sheets of steel and magnesium from abrasion and minor nicks during production and storage of the printing plate.

The wrapped, mated sheets of magnesium and steel are then placed between two over-sized equalizing mats. Preferably, each equalizing sheet is characterized as being fifty durometer in hardness with a thickness approximately 0.11 inches. Prefer able, the equalizing sheets are composed of rubber, or a synthetic rubber-like material, capable of withstanding heat without degradation of the material itself or its inherent resiliency.

The wrapped and mated sheets of magnesium and steel are then placed in a hydraulic press such as a rubber plate vulcanizer with the equalizing sheets on opposing sides thereof. The press is operated to exert uniform pressure throughout the entire area of the mated sheets of magnesium and steel. Preferably, the press is operated to compress the sheets of magnesium and steel together until only approximately three mils of the adhesive remains between the mating sheets of magnesium and steel, with all excess adhesive being forced out therebetween. This compression preferably takes place at approximately three hundred degrees to three hundred twenty degrees Fahrenheit for approximately fifteen minutes.

After fifteen minutes in the press, the now laminated sheets of magnesium and steel, together with the equalizing sheets, are removed from the press. The wrapped, now laminated printing plate laminate is then removed from between the equalizing sheets and placed in storage to be later cut to size and photoengraved as conventional in the art.

EXAMPLE 2

Example 2 proceeds substantially in accordance with Example 1 above, but includes the additional steps of positioning an adhesive-impermeable thin sheet of material, such as silicone paper, on opposing sides of each of the equalizing sheets such that any adhesive forced out from between the mated sheets of magnesium and steel is precluded from contaminating the equalizing sheets.

EXAMPLE 3

Example 3 proceeds substantially in accordance with Example 1 above, but further includes the step of positioning a pair of breaker bars along the opposing edges of the wrapped, mated sheets of magnesium and steel and the equalizing sheets, with each breaker bar including a height such that, upon full compression by the press, all but three mils of the adhesive is forced out from between the mating surfaces of the sheets of magnesium and steel.

EXAMPLE 4

Example 3 proceeds substantially in accordance with Example 1 above, but includes the additional step of etching the entire surface of the sheet of magnesium (or other etchable metal) to reduce the thickness of the sheet and the resulting thickness of the laminated printing plate. This novel step allows excessively thick sheets of magnesium (e.g., 20–40 mils —which tend to be more commercially available) to be used in the method of the invention to produce a laminated printing plate of a desired, optimum thickness.

EXAMPLE 5

Example 5 proceeds substantially in accordance with Example 1 above, except that the sheet of steel has been coldrolled to a temper of approximately No. 2 (half-hard).

EXAMPLE 6

Example 6 proceeds substantially in accordance with Example 1 above but includes the additional step of encapsulating the outer surface of the sheet of steel and its edges within an acid-proof membrane to prevent exposure of the steel during etching. This step remarkably increases the life of the nitric acid bath used to etch the laminated printing plate. A great number of printing plates can be etched by the same acid bath.

EXAMPLE 7

Example 7 proceeds substantially in accordance with the Examples above, but includes the additional step of curving the laminated printing plate, after photoengraving, to fit a conventional printing cylinder, This step unexplainably produces a matte finish on the surface of the magnesium, thereby resulting in great ink transfer during the print process.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described, what is claimed is:

1. A method for producing a photoengravable, laminated printing plate, comprising the steps of:

providing a sheet of etchable magnesium having a thickness approximately equal to or greater than the desired relief upon photoengraving;

providing a sheet of steel to be laminated with the sheet of etchable magnesium;

applying a homogenous adhesive free of non-compressible materials to the mating surface of the sheet of steel or the sheet of etchable magnesium;

mating the mating surfaces of the sheets of steel and etchable magnesium together;

providing a pair of equalizing sheets and positioning the equalizing sheets on opposing sides of the mated sheets of magnesium and steel;

placing the mated sheets of steel and etchable magnesium into a press;

operating the press to compress the mated sheets of steel and etchable magnesium until the adhesive is uniformly dispersed therebetween; and removing the compressed mated sheets of steel and etchable magnesium from the press after curing of the adhesive.

2. The method as set forth in claim 1, further including the step of wrapping the mated sheets of magnesium and steel with a sheet of material to prevent the adhesive forced from between the mated sheets of magnesium and steel from contacting the equalizing sheets and the press.

3. The method as set forth in claim 2, further including the step of positioning a pair of breaker bars on opposing edges of the equalizing sheets, with the breaker bars including a height sufficient to assure that the desired thickness of the adhesive between the sheets of magnesium and steel will be obtained upon compression of the mated sheets of magnesium and steel.

4. The method as set forth in claim 3, wherein the step of applying an adhesive to the mating surface of the sheet of magnesium or the sheet of steel comprises the step of applying an easily spread adhesive to the mating surface of the sheet of magnesium or the sheet of steel and wherein the step of operating the press to compress the mated sheets of steel and magnesium comprises the step of compressing the mated sheets of magnesium and steel until the desired thickness of the adhesive between the mated sheets of magnesium and steel is obtained.

5. The method as set forth in claim 1, wherein the sheet of steel is hard tempered.

6. The method as set forth in claim 1, wherein the sheet of steel is half-hard tempered.

7. The method as set forth in claim 5, wherein the sheet of steel is approximately 0.005 to 0.015 inch thick, wherein the sheet of magnesium is approximately 0.020 to 0.030 inch thick, and wherein the step of operating the press comprises the step of operating the press until only a thin, air bubble-free layer of adhesive remains between the mated sheets of magnesium and steel.

8. The method as set forth in claim 7, wherein the step of operating the press comprises the step of operating the press until only a thickness of adhesive approximately 0.003 inch remains between the mated sheets of steel and magnesium.

* * * * *

UNITED STATES PATENT AND TRADEMARK OFFICE
CERTIFICATE OF CORRECTION

PATENT NO. : 4,684,429

DATED : August 4, 1987

INVENTOR(S) : Edward L. Dalton, Jr.

It is certified that error appears in the above-identified patent and that said Letters Patent is hereby corrected as shown below:

in column 2, at line 16, please delete "an apparatus and";

in column 3, at line 25, please delete "apparatus";

in column 3, at line 26, please delete "and method";

in column 3, at line 26, please delete "the apparatus of";

in column 3, at line 66, please delete "trialed" and insert therefor --troweled--;

in column 4, at line 8, please delete "from" and insert therefor --to--;

in column 4, at line 45, please delete "APPARATUS";

in column 4, at line 46, please delete "FIG.1" and insert therefor --The figure of the drawing--;

in column 5, at line 37, please delete "are" and insert therefor --is--;

in column 5, at line 49, please delete "trialed" and insert therefor --troweled--;

in column 5, at line 67, please delete "Prefer able" and insert therefor --Preferably--; and

UNITED STATES PATENT AND TRADEMARK OFFICE
CERTIFICATE OF CORRECTION

PATENT NO. : 4,684,429

DATED : August 4, 1987

INVENTOR(S) : Edward L. Dalton, Jr.

It is certified that error appears in the above-identified patent and that said Letters Patent is hereby corrected as shown below:

in column 6, at line 46, please delete the numeral "3" and insert therefor --4--.

Signed and Sealed this

Twenty-third Day of August, 1988

*Attest:*

DONALD J. QUIGG

*Attesting Officer*

*Commissioner of Patents and Trademarks*